（12）United States Patent
Mazzacani et al.

(10) Patent No.: US 6,490,411 B1
(45) Date of Patent: Dec. 3, 2002

(54) APS LOYALTY CAMERA WITH LOCKING FILM DOOR AND EXTERNAL KEY THEREFOR

(75) Inventors: Giorgio Mazzacani, Bloomingdale, NJ (US); Tony Ho Yin Yip, Hong Kong (HK)

(73) Assignee: Concord Camera Corp., Hollywood, FL (US)

( * ) Notice: Subject to any disclaimer, the term of this patent is extended or adjusted under 35 U.S.C. 154(b) by 0 days.

(21) Appl. No.: 09/528,939

(22) Filed: Mar. 21, 2000

(51) Int. Cl.[7] .............................................. G03B 17/02
(52) U.S. Cl. .............................. 396/6; 396/536; 396/538
(58) Field of Search .......................... 396/6, 511, 538, 396/536, 535, 543; 200/333; 70/455, 448, 55

(56) References Cited

U.S. PATENT DOCUMENTS

| | | | | |
|---|---|---|---|---|
| 5,669,018 A | * | 9/1997 | Kamata | 396/6 |
| 5,708,856 A | * | 1/1998 | Cloutier | 396/6 |
| 5,727,247 A | * | 3/1998 | Smart et al. | 396/538 |
| 5,748,990 A | * | 5/1998 | Smart et al. | 396/6 |
| 5,752,085 A | * | 5/1998 | Cloutier | 396/6 |
| 5,903,791 A | * | 5/1999 | Okada | 396/535 |

* cited by examiner

Primary Examiner—David M. Gray
(74) Attorney, Agent, or Firm—Scott L. Lampert (57) ABSTRACT

An APS camera having means for limiting removal and replacement of the film cartridge to those designated to do so. The camera includes an access door to provide access to a film cartridge receiving compartment. A latch disposed on the exterior sidewall of the camera main body, adjacent the film cartridge receiving compartment, secures the access door in the closed position. A lock mechanism, comprising an outer housing and an inner lever disposed within the outer housing, is secured to an exterior sidewall of the camera casing over the latch. The lever is structured for movement from a first blocking position, wherein the latch is inaccessible, to a second open position, wherein the latch may be accessed and the access door opened. The lever includes a pair of outwardly extending locking pins structured for mating engagement with corresponding holes in the housing so as to retain the lever in the first blocking position. Pushing the locking pins down through the holes in the housing enables the lever to be moved into the second open position. A key is provided to push the pins down through the holes in the housing and to engage and move the latch from the first latching position to the second unlatching position.

32 Claims, 9 Drawing Sheets

APS LOYALTY CAMERA WITH LOCKING FILM DOOR AND EXTERNAL KEY THEREFOR

BACKGROUND

Customer loyalty is a desired objective of all businesses. As such, businesses are continuously searching for ways to keep their customers coming back. For businesses in highly competitive industries, customer loyalty is often vital to the success of the business.

However, for businesses mainly selling common consumable products, this is a particularly difficult problem. In such industries, price is often the force driving customer purchases and, consequently, customer loyalty tends to be low. Accordingly, businesses in these industries are particularly interested in means for generating repeat business.

One means of accomplishing this is to provide a consumable product, which cannot be replenished by others. However, as stated previously, this is particularly difficult to accomplish when dealing with common consumables. For instance, film processing services are widely available and, for the most part, are virtually indistinguishable from one business to another. Thus, consumers tend to choose film processing services based on price. Accordingly, film processing services are constantly searching for means to guide consumers back into their stores.

One such device developed to address this need is shown in U.S. Pat. No. 5,752,085 to Cloutier. Cloutier discloses a rental camera having an auxiliary key structured to open the film and battery reloading doors and to initiate the camera rewind mechanism. Although somewhat useful for its intended purpose, the Cloutier camera includes certain inherent limitations which limit its overall effectiveness. First, the Cloutier locking mechanism includes a fairly specific and complicated structure, which is not easily adaptable to existing camera configurations. Additionally, the Cloutier locking mechanism is specifically designed for a camera rear door and is not structured for use with, and does not contemplate use with, APS cameras, in which access to the film cartridge is, typically, via a port in the bottom of the camera under the film cartridge compartment.

Accordingly, there is still a need in the art for a locking mechanism for APS cameras, which limits the ability to remove and replace the film cartridge to those having the proper key. Any such system should be easily adaptable to existing camera structures and easy to operate. The present invention is particularly suited to overcome those problems remaining in the art in a manner not previously known.

SUMMARY OF THE INVENTION

The present invention is directed towards a new and improved APS camera having means for limiting removal and replacement of the film cartridge to those designated to do so. The camera includes an access door to provide access to a film cartridge receiving compartment. A latch disposed on the exterior sidewall of the camera main body, adjacent the film cartridge receiving compartment, secures the access door in the closed position. A lock mechanism, comprising an outer housing and an inner lever disposed within the outer housing, is secured to an exterior sidewall of the camera casing over the latch. The lever is structured for movement from a first blocking position, wherein the latch is inaccessible, to a second open position, wherein the latch may be accessed and the access door opened. The lever includes a pair of outwardly extending locking pins structured for mating engagement with corresponding holes in the housing so as to retain the lever in the first blocking position. Pushing the locking pins down through the holes in the housing enables the lever to be moved into the second open position. A key is provided to push the pins down through the holes in the housing and to engage and move the latch from the first latching position to the second unlatching position.

It is an object of the present invention to provide a new and improved camera having all of the advantages of the prior art and none of the disadvantages.

It is another object of the present invention to provide an APS camera having locking means for limiting the ability to remove and replace the film cartridge.

It is also an object of the present invention to provide such a camera, which includes an external tool for unlocking the film cartridge compartment access door.

It is a further object of the present invention to provide such a system, which is easily adaptable to existing camera structures.

It is yet another object of the present invention to provide such a system, which is easy to operate.

These and other objects and advantages of the present invention will become more apparent in the description which follows.

BRIEF DESCRIPTION OF THE DRAWINGS

For a fuller understanding of the nature of the present invention, reference should be had to the following detailed description, taken in connection with the accompanying drawings in which.

DETAILED DESCRIPTION OF THE PREFERRED EMBODIMENT

Before explaining the disclosed embodiment of the present invention in detail, it is to be understood that the invention is not limited in its application to the details of the particular arrangement shown since the invention is capable of other embodiments. Also, the terminology used herein is for the purpose of description and not of limitation.

Referring to FIGS. 1–11, the present invention is directed towards a new and improved camera 10 having means for limiting removal and replacement of the film cartridge to those designated to do so. The camera 10 of the present invention is of the APS type having a main body 12 with a taking lens, a film cartridge receiving compartment 11 disposed on one side of the taking lens and a take-up spool (not shown) disposed on the opposite side of the taking lens. Front 18 and rear 19 covers, comprising a camera casing, are structured to mate with another and enclose the main body 12 therein.

Such APS cameras further include a film cartridge access door 14 hingedly disposed below the film cartridge receiving compartment 11, structured for swinging movement between a closed position and an open position, and a latch 20 to retain the access door 14 in the closed position and release the access door 14, when desired, so that it may be swung into the open position for film removal and reloading.

Figure 10:
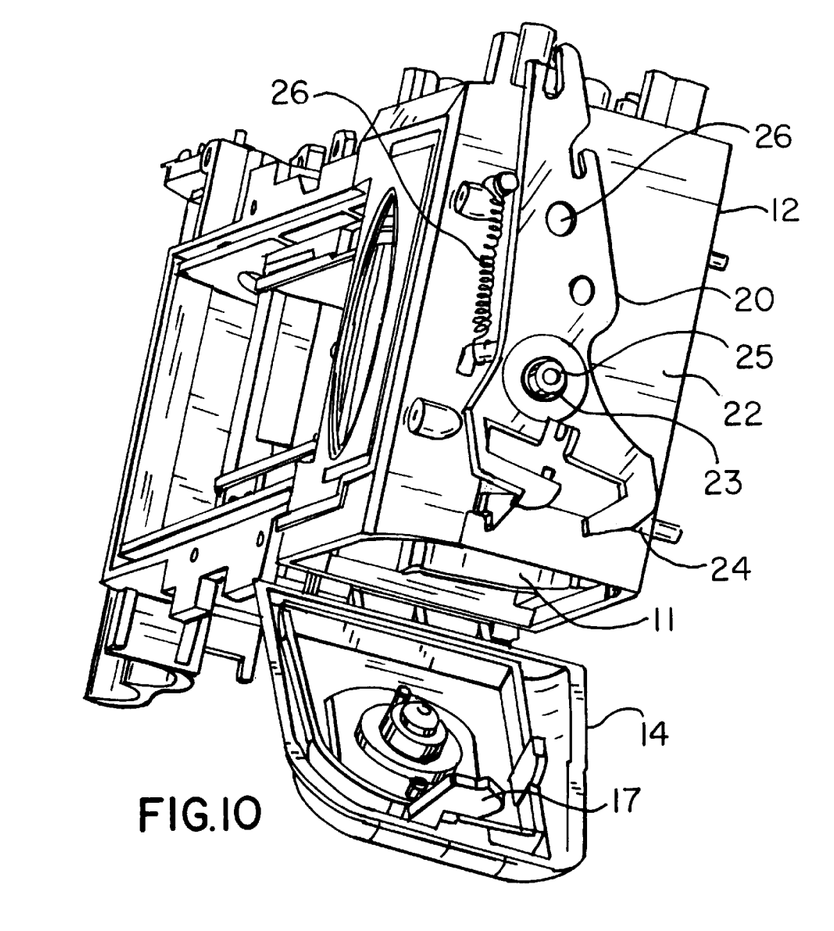
FIG. 10 is a side perspective view of the main body showing the latch in the unlatched position.
Figure 11:
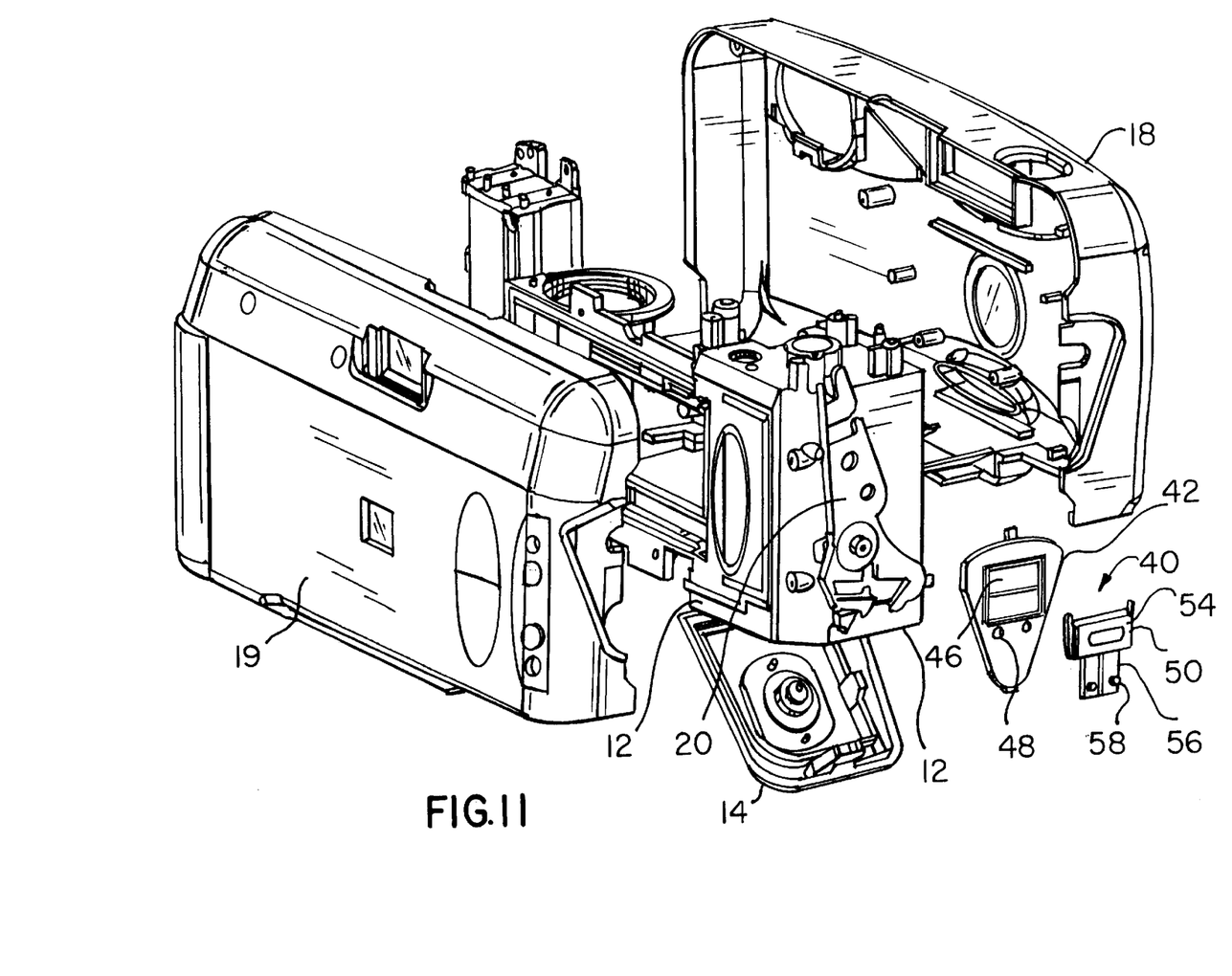
FIG. 11 is an exploded view of the camera of the present invention. Like reference numerals refer to like parts throughout the several views of the drawings

The latch 20 is pivotally mounted to an exterior sidewall 22 of the main body 12, beneath the front 18 and rear 19 covers, along the side of the film cartridge receiving compartment. The latch 20 includes a generally centrally disposed hole 23 structured to be mounted on a post 25 on the sidewall 22 of the main body 12 so that the latch 20 may pivot thereabout. The bottom end of the latch 20 includes a hook 24 structured for mating engagement with a corresponding hook 17 on the access door 14. The latch 20 is structured for swinging movement between a first latching position, wherein the hook 24 on the latch 20 mates with the hook 17 on the access door 14, thereby retaining the access door 14 in the closed position (FIG. 9), and a second unlatching position, wherein the hook 24 on the latch 20 is disengaged from the hook 17 on the access door 14, thereby enabling the access door 14 to be opened (FIG. 10). The latch 20 is biased in the first latching position via a spring 26 mounted to the sidewall 22 of the main body 12.

Conventional APS cameras, typically, include a lever pivotally mounted to an exterior sidewall 32 of the front 18 and rear 19 covers, over the latch 20. The lever is generally triangular-shaped and includes a first inwardly disposed, cylindrical-shaped member at its bottom end, structured to be mounted through a hole in the front 18 and rear 19 covers and the hole 23 in the latch 20 and about the post 25 on the sidewall 22 of the main body 12. A second cylindrical-shaped member extends inward from an upper portion of the lever through a slot in the front 18 and rear 19 covers and a hole 26 in the upper portion of the latch 20. Pivoting the lever about its lower end causes a corresponding pivoting or swinging movement of the latch 20 between the first latching position and the second unlatching position.

The camera 10 of the present invention replaces the lever of conventional APS cameras with a locking mechanism 40 to prevent the latch 20 from being moved into the second unlatching position without the proper key, thereby retaining the access door 14 in the closed position and preventing removal and replacement of the film cartridge. The locking mechanism 40 comprises an outer, generally triangular-shaped housing 42 and an inner lever 50.

Figure 8:
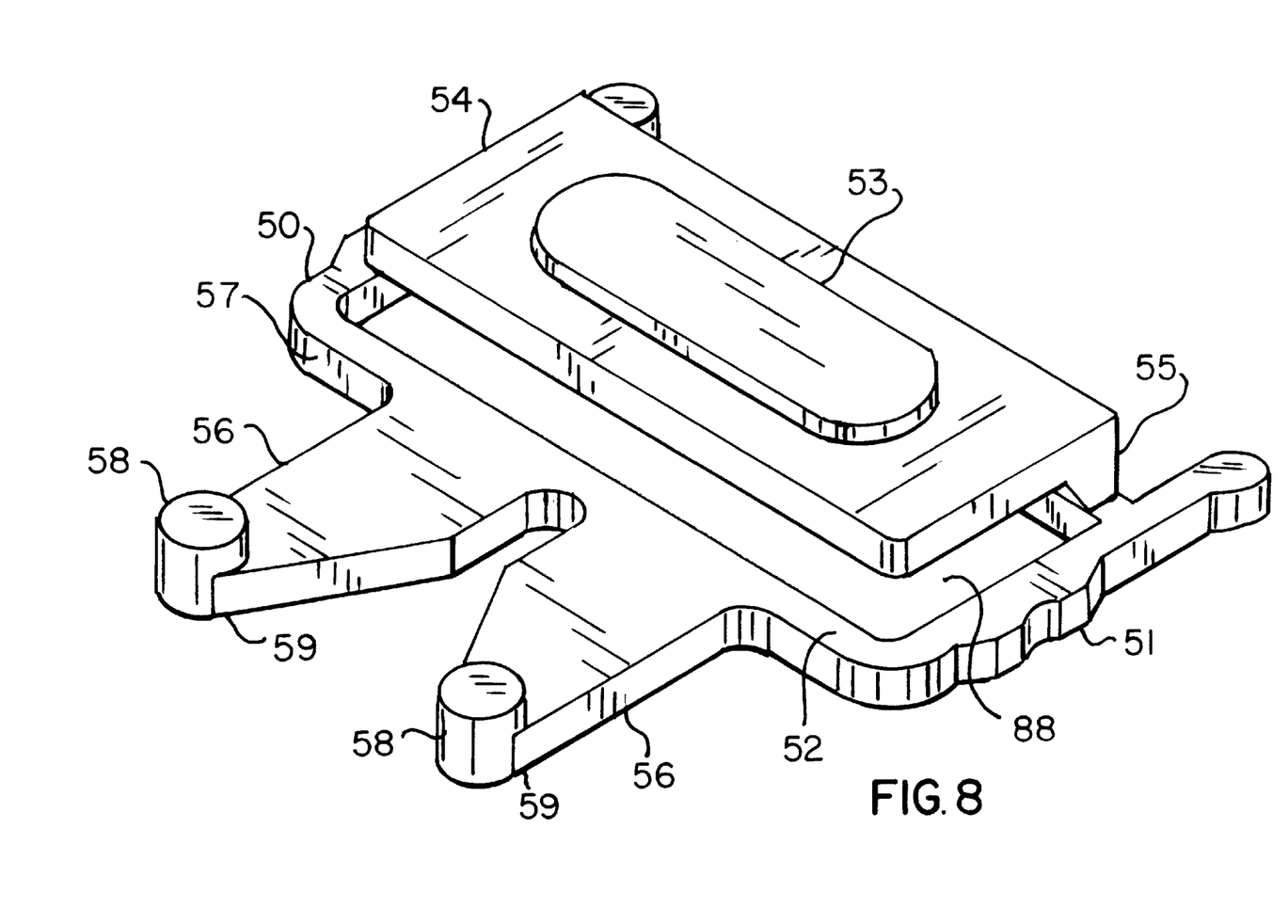
FIG. 8 is a perspective view of the lock mechanism lever.
Figure 9:
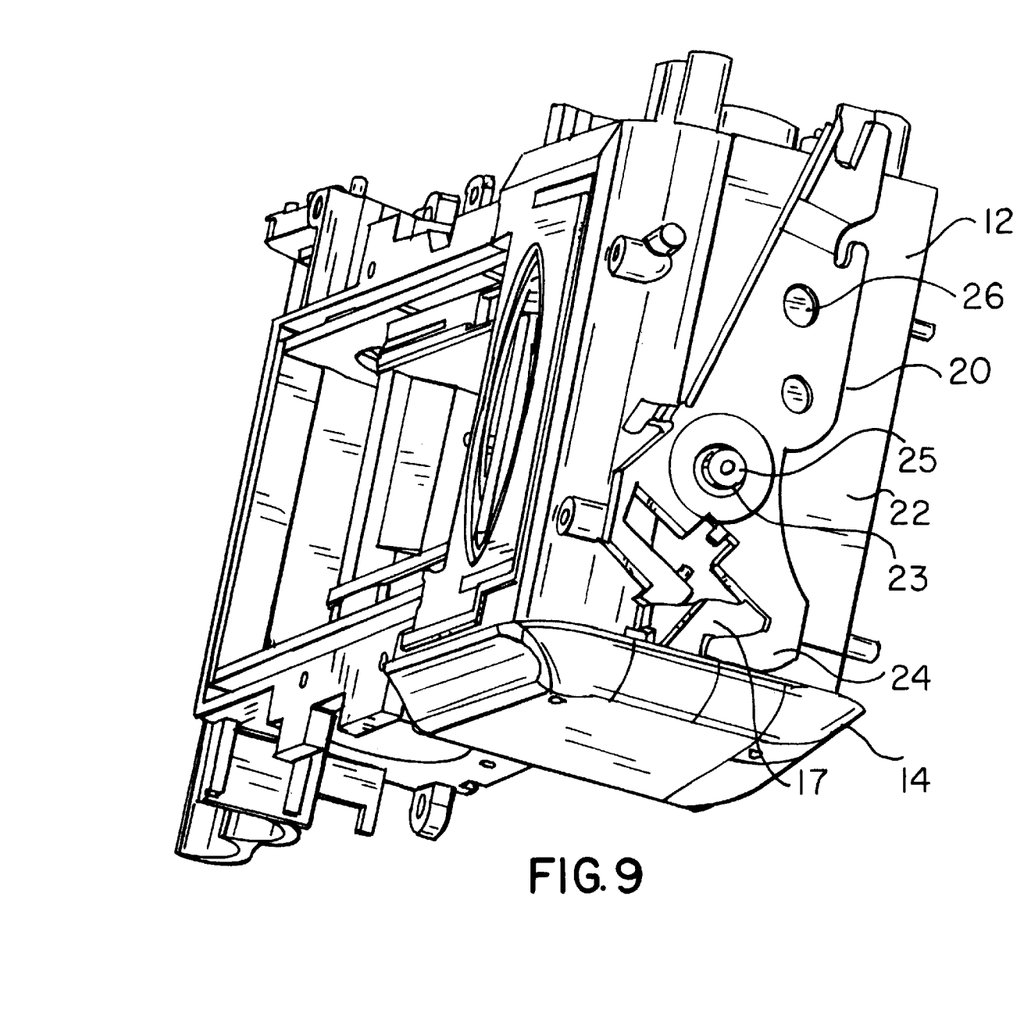
FIG. 9 is a side perspective view of the main body showing the latch in the latched position.

The lever 50 includes a base portion 52 and a raised tab 54 disposed above the base portion 52 in generally parallel relation thereto. The tab 54 is attached to the base portion 52 by a single wall 55 extending between the upper ends of the tab 54 and base portion 52, in perpendicular relation thereto, thereby forming an open space 88, surrounded only by the single wall 55, between the base portion 52 and tab 54. A pair of legs 56 extend downward from the lower edge 57 of the base portion 52. A generally cylindrical-shaped post 58 extends upward from the outer distal end 59 of each leg 56.

Figure 5:
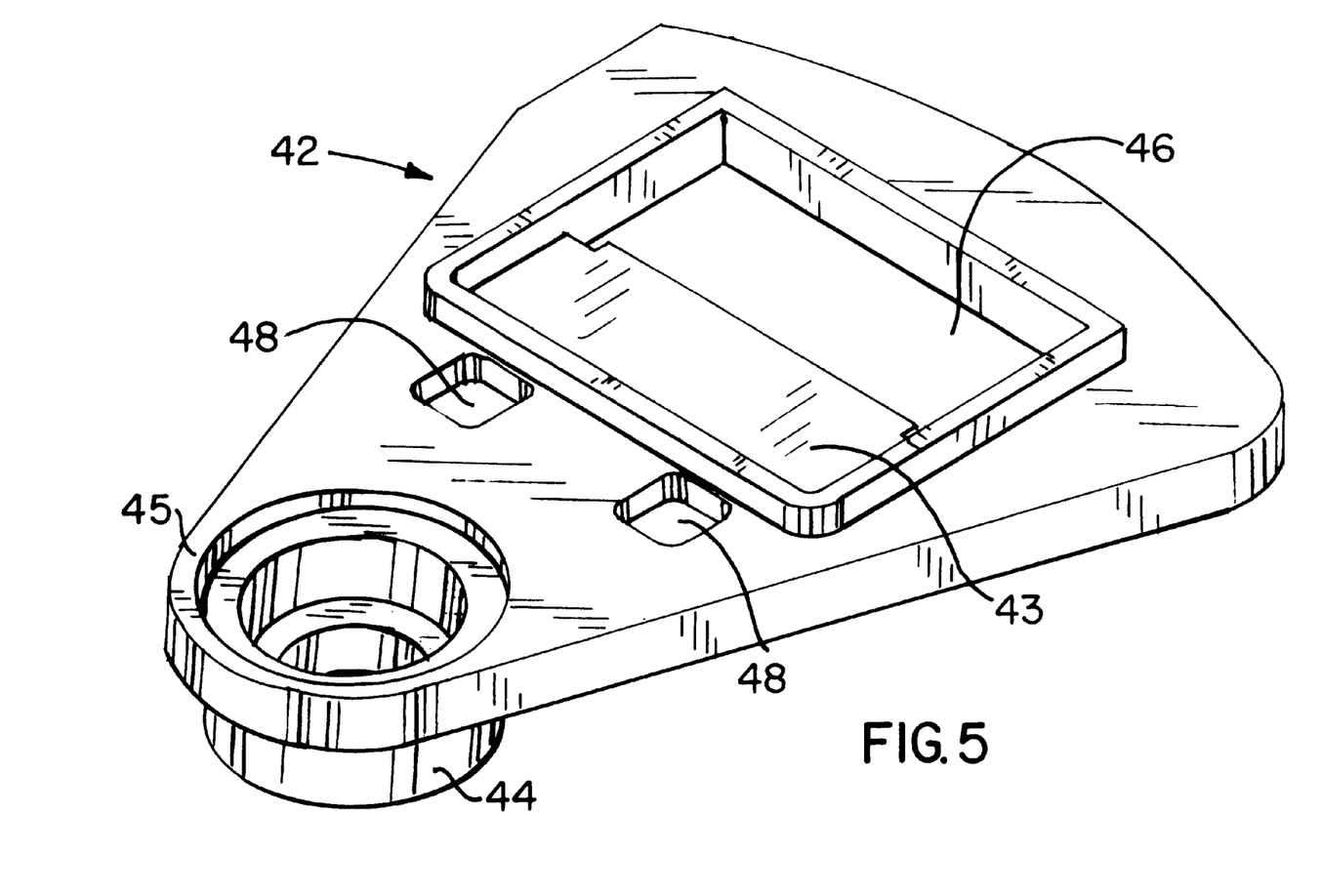
FIG. 5 is a top perspective view of the lock mechanism housing.

The housing 42 includes an inwardly disposed, cylindrical-shaped member 44 at its bottom end 45. The cylindrical-shaped member 44 is structured to be mounted through a hole in the front 18 and rear 19 covers and the hole 23 in the latch 20 and about the post 25 on the sidewall 22 of the main body 12 in the same manner as the cylindrical-shaped member of the lever on conventional APS cameras. The housing 42 further includes a window 46 extending through its upper portion and a pair of holes 48 extending therethrough beneath the window 46. The window 46 and holes 48 are structured and disposed to receive the lever 50 tab 54 and posts 58, respectively, therein, when the lever 50 is positioned beneath the housing 42.

Figure 1:
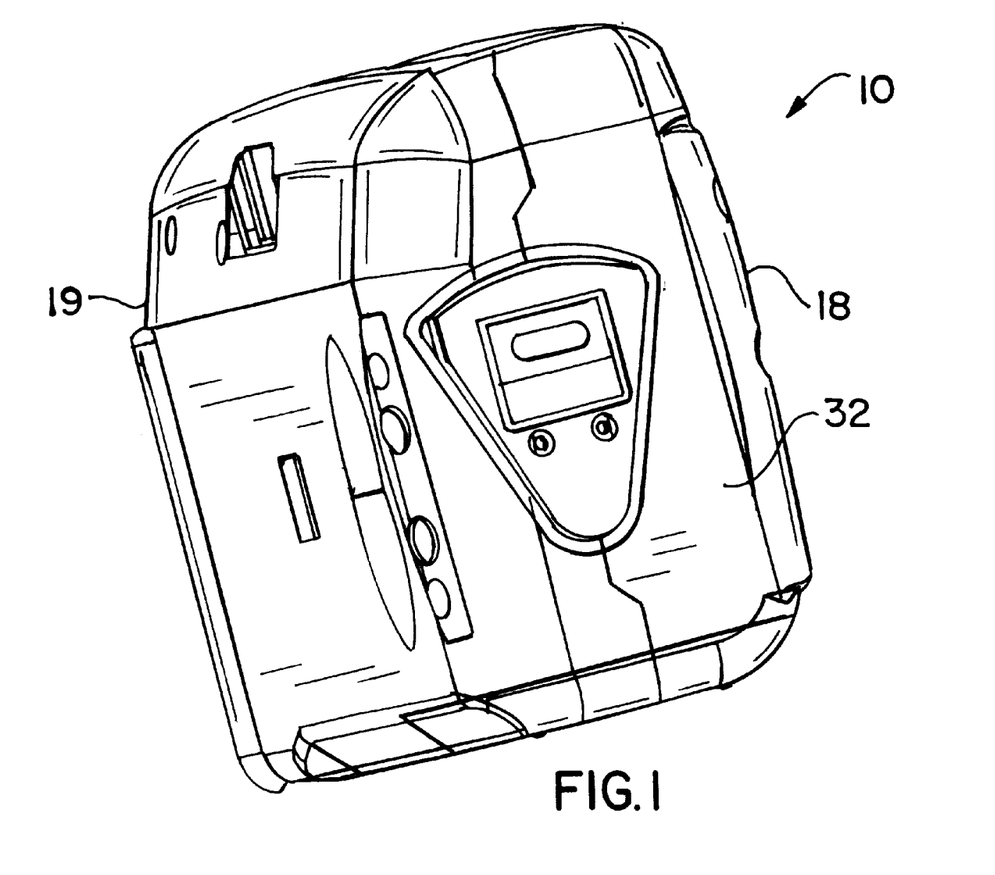
FIG. 1 is a side perspective view of the camera of the present invention.
Figure 2:
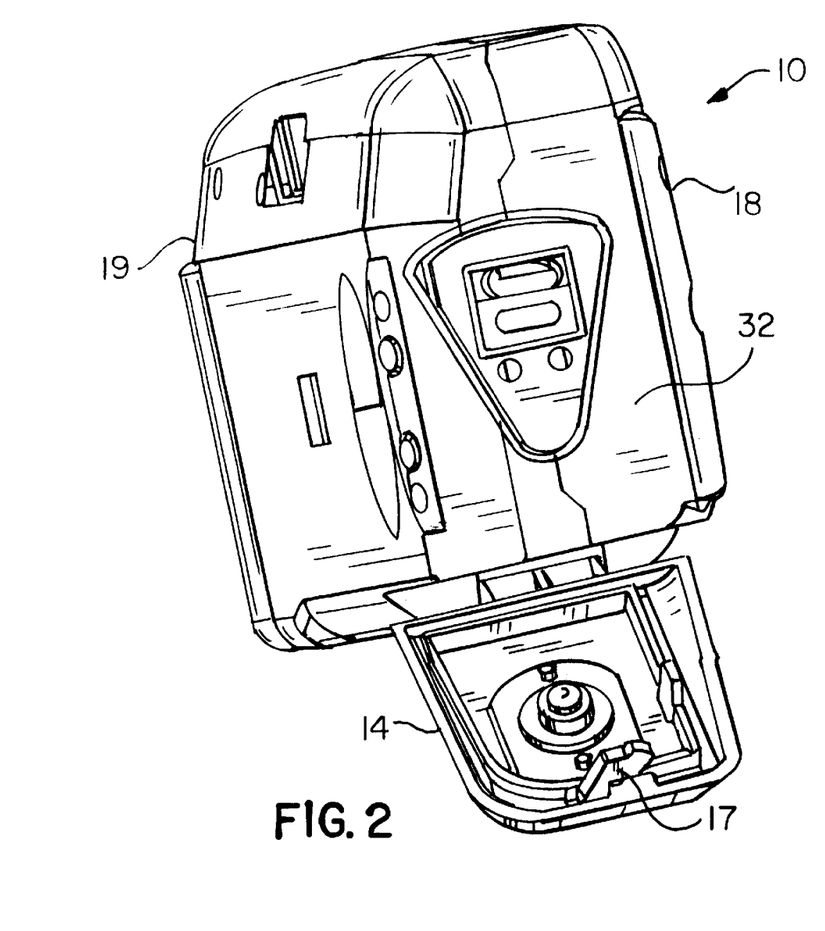
FIG. 2 is a side perspective view of the camera of the present invention with the access door open.
Figure 3:
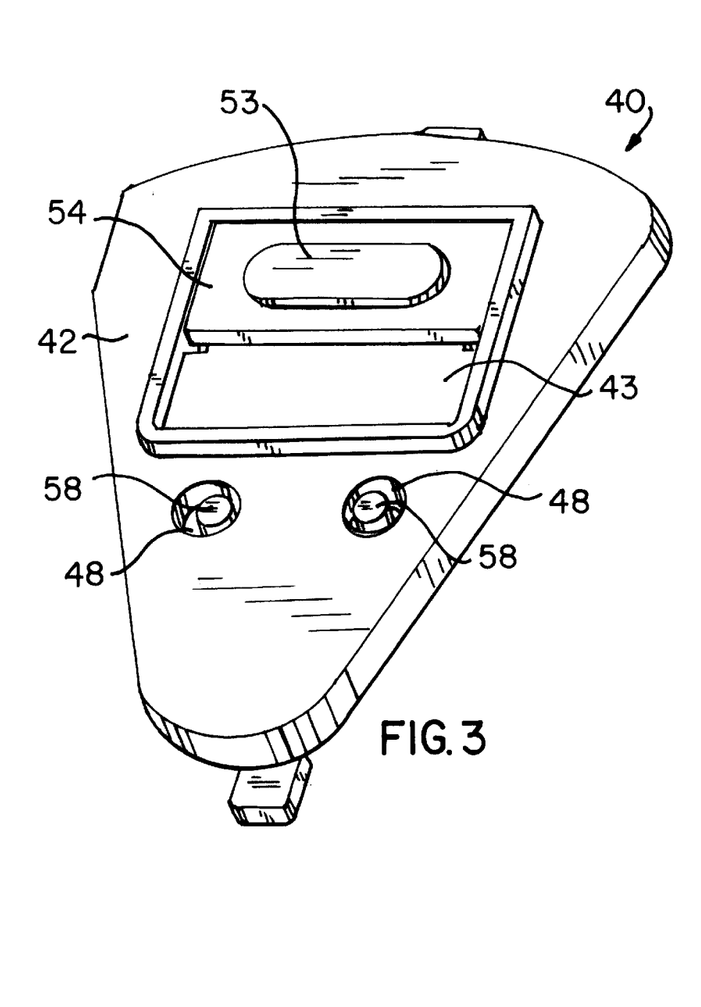
FIG. 3 is a perspective view of the lock mechanism housing with the tab in the blocking position.
Figure 6:
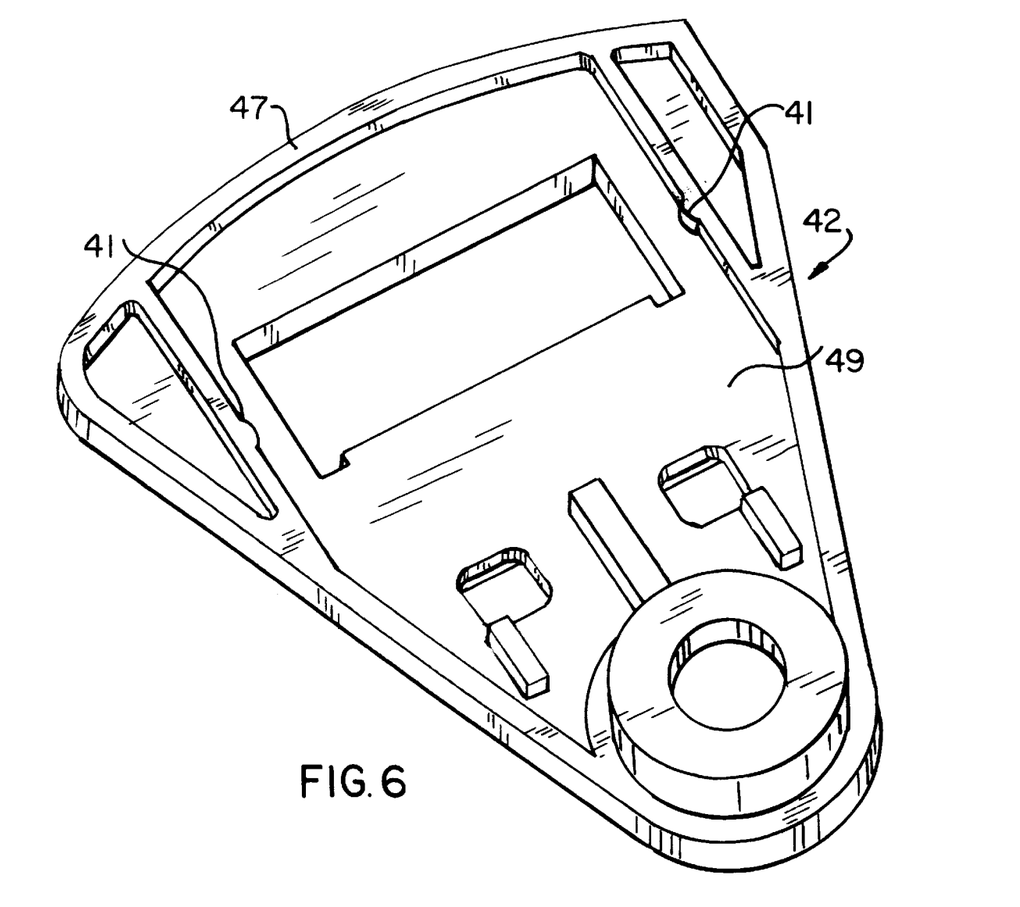
FIG. 6 is a bottom perspective view of the lock mechanism housing.

The underside of the housing 42 includes a surrounding sidewall structure 47 defining a recessed portion 49 within which the lever 50 may be positioned. In use, the lever 50 is positioned within the recessed portion 49 so that the tab 54 is seated within the window 46 and the posts 58 extend into the holes 48. The housing 42 and lever 50 structure is then mounted to the exterior sidewall 32 of the front 18 and rear 19 covers, over the latch 20, in place of the lever used in conventional APS cameras. In this position, the tab 54 of the lever 50 prevents access to the latch 20.

Figure 4:
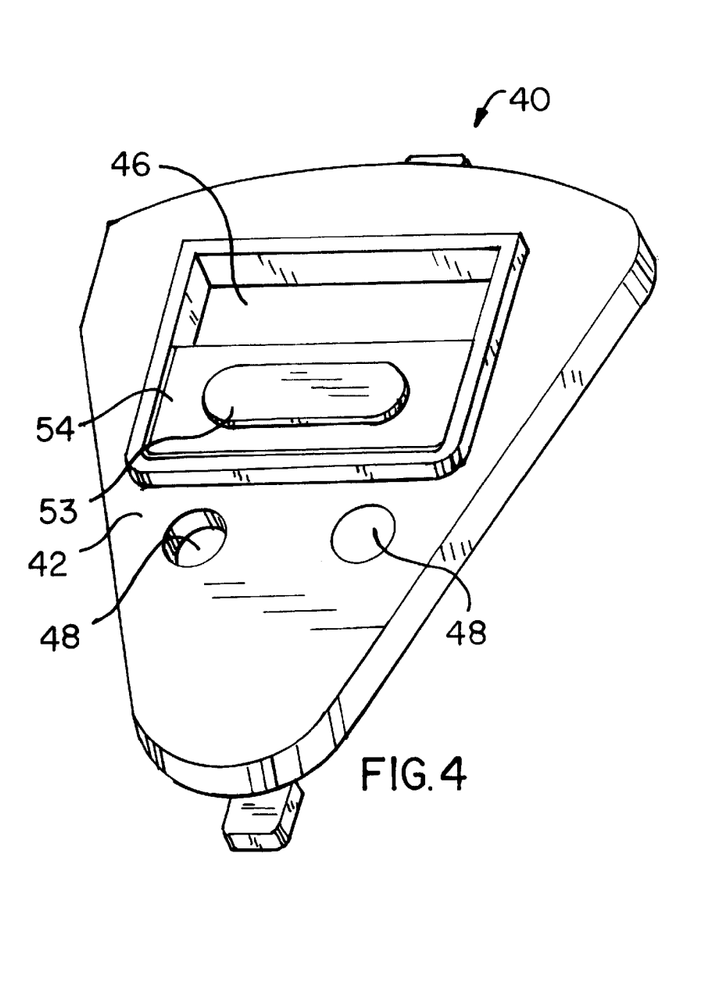
FIG. 4 is a perspective view of the lock mechanism housing with the tab in the open position.

By pushing the posts 58 downward out of the holes 48 and sliding the tab 54 away from the window 46, so that the portion 43 of the housing 42 beneath the window 46 is positioned within the open space 88 between the base portion 52 and tab 54, the hole 26 in the upper portion of the latch 20 becomes accessible. A raised generally oval-shaped projection 53 is provided on the top surface of the tab 54 to facilitate gripping and sliding of the lever 50. By inserting a pin into the hole 26 in the upper portion of the latch 20, the latch 20 may now be swung from its first latching position to the second unlatching position, thereby disengaging the hook 24 on the latch 20 from the hook 17 on the access door 14 so that the access door 14 may be opened. Ridges 51 on the outer lateral edges of the lever 50 are structured for mating engagement with a corresponding projecting rib 41 on the inside lateral walls of the sidewall structure 47 to retain the lever 50 in place in the lower position.

Figure 7:
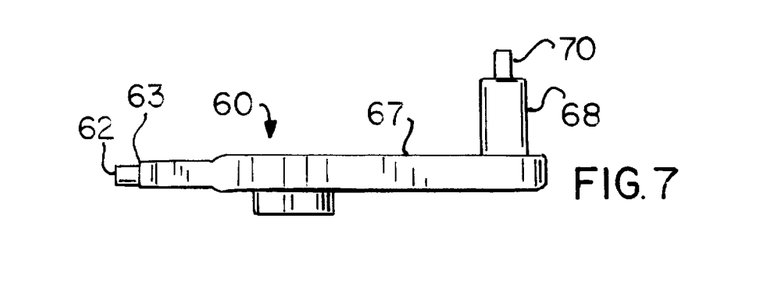
FIG. 7 is a side elevation view of the key.

An external key 60, having a pair of pins 62 corresponding in size and shape to the holes 48 in the housing 42 projecting out from one of its edges 63, is provided to depress the posts 58 downward out of the holes 48 so that the lever 50 may be slid into the lower position. The key 60 also includes a cylindrical-shaped post 68 extending out from its top face 67, in generally perpendicular relation thereto and a pin 70 extending out from the top face of the post 68. The pin 70 is structured for insertion into the hole 26 in the upper portion of the latch 20, to facilitate the swinging of the latch 20 from the first latching position to the second unlatching position. Indicia may be provided on the top face 67 of the key 60 to instruct the user of its proper usage.

While the invention has been described, disclosed, illustrated and shown in various terms of certain embodiments or modifications, which it has presumed in practice, the scope of the invention is not intended to be, nor should it be deemed to be, limited thereby and such other modifications or embodiments as may be suggested by the teachings herein are particularly reserved, especially as they fall within the breadth and scope of the claims here appended.

What is claimed is:

1. A camera comprising:

a main body having a film cartridge receiving compartment;

an outer casing structured to enclose said main body;

a film cartridge access door mounted below said film cartridge receiving compartment, said access door being structured for swinging movement between a closed position and an open position;

a latch structured for movement between a first latching position, wherein said latch retains said access door in said closed position, and a second unlatching position, wherein said latch is disengaged from said access door and said access door may be opened;

a lock mechanism structured for movement from a first locking position, wherein said latch is inaccessible, to a second unlocking position, wherein said latch may be accessed and moved into said second unlatching position; and a key structured to engage said lock mechanism so that said lock mechanism may be moved from said first locking position to said second unlocking position.

2. The camera of claim 1, wherein said key is further structured to engage said latch for movement from said first latching position to said second unlatching position.

3. The camera of claim 1, wherein said latch includes a biasing mechanism structured to force said latch into said first latching position from said second unlatching position.

4. The camera of claim 1, wherein said lock mechanism comprises an outer housing secured to an exterior side wall of said casing and an inner lever disposed between said housing and said exterior side wall of said casing, said lever being structured for movement from a first blocking position, wherein said latch is inaccessible, to a second open position, wherein said latch may be accessed and moved into said second unlatching position.

5. The camera of claim 4, wherein said housing includes a window disposed above said latch, said window providing access to said latch when said lever is in said second open position.

6. The camera of claim 5, wherein said lever includes a raised tab structured to substantially fill said window when said lever is in said first blocking position.

7. The camera of claim 6, wherein said tab is further structured to slide over a portion of said housing adjacent said window as said lever is moved into said second open position.

8. The camera of claim 4, wherein said lever includes at least one outwardly extending locking pin structured for mating engagement with a hole in said housing so as to retain said lever in said first blocking position, wherein pushing said at least one locking pin down through said hole in said housing enables said lever to be moved into said second open position.

9. The camera of claim 4, wherein said housing includes a bottom surface having a surrounding sidewall structure defining a recessed portion within which said lever is mounted.

10. The camera of claim 6, further including a projecting portion extending out of a top face of said tab to facilitate gripping and sliding of said lever.

11. A camera comprising:

a main body having a film cartridge receiving compartment;

an outer casing structured to enclose said main body;

a film cartridge access door mounted below said film cartridge receiving compartment, said access door being structured for swinging movement between a closed position and an open position;

a latch structured for movement between a first latching position, wherein said latch retains said access door in said closed position, and a second unlatching position, wherein said latch is disengaged from said access door and said access door may be opened;

a lock mechanism comprising an outer housing secured to an exterior sidewall of said casing and a lever disposed between said housing and said exterior sidewall of said casing, said lever being structured for movement from a first blocking position, wherein said latch is inaccessible, to a second open position, wherein said latch may be accessed and moved into said second unlatching position; and a key structured to engage said lock mechanism so that said lever may be moved from said first blocking position to said second open position.

12. The camera of claim 11, wherein said housing includes a window disposed above said latch, said window providing access to said latch when said lever is in said second open position.

13. The camera of claim 12, wherein said lever includes a raised tab structured to substantially fill said window when said lever is in said first blocking position.

14. The camera of claim 13, wherein said tab is further structured to slide over a portion of said housing adjacent said window as said lever is moved into said second open position.

15. The camera of claim 11, wherein said lever includes at least one outwardly extending locking pin structured for mating engagement with a hole in said housing so as to retain said lever in said first blocking position, wherein pushing said at least one locking pin down through said hole in said housing enables said lever to be moved into said second open position.

16. The camera of claim 11, wherein said housing includes a bottom surface having a surrounding sidewall structure defining a recessed portion within which said lever is mounted.

17. The camera of claim 13, further including a projecting portion extending out of a top face of said tab to facilitate gripping and sliding of said lever.

18. The camera of claim 15, wherein said key includes at least one outwardly projecting pin structured for pushing said at least one locking pin down through said hole in said housing.

19. The camera of claim 11, wherein said key is further structured to engage and move said latch from said first latching position to said second unlatching position.

20. The camera of claim 11, wherein said latch includes a biasing mechanism structured to force said latch into said first latching position from said second unlatching position.

21. A camera comprising:

a main body having a film cartridge receiving compartment;

an outer casing structured to enclose said main body;

a film cartridge access door mounted below said film cartridge receiving compartment, said access door being structured for swinging movement between a closed position and an open position;

a latch structured for movement between a first latching position, wherein said latch retains said access door in said closed position, and a second unlatching position, wherein said latch is disengaged from said access door and said access door may be opened;

a lock mechanism comprising an outer housing secured to an exterior sidewall of said casing and an inner lever disposed between said housing and said exterior sidewall of said casing, said lever being structured for movement from a first blocking position, wherein said latch is inaccessible, to a second open position, wherein said latch may be accessed and moved into said second unlatching position, said lever including at least one outwardly extending locking pin structured for mating engagement with a hole in said housing so as to retain said lever in said first blocking position, wherein pushing said at least one locking pin down through said hole in said housing enables said lever to be moved into said second open position; and a key structured to engage said lock mechanism so that said lock mechanism may be moved from said first locking position to said second unlocking position, said key being further structured to engage and move said latch from said first latching position to said second unlatching position.

22. The camera of claim 21, wherein said housing includes a window disposed above said latch, said window providing access to said latch when said lever is in said second open position.

23. The camera of claim 22, wherein said lever includes a raised tab structured to substantially fill said window when said lever is in said first blocking position.

24. The camera of claim 23, wherein said tab is further structured to slide over a portion of said housing adjacent said window as said lever is moved into said second open position.

25. The camera of claim 21, wherein said housing includes a bottom surface having a surrounding sidewall structure defining a recessed portion within which said lever is mounted.

26. The camera of claim 23, further including a projecting portion extending out of a top face of said tab to facilitate gripping and sliding of said lever.

27. The camera of claim 21, wherein said key includes at least one outwardly projecting pin structured for pushing said at least one locking pin down through said hole in said housing.

28. The camera of claim 21, wherein said latch includes a biasing mechanism structured to force said latch into said first latching position from said second unlatching position.

29. A method of opening a film cartridge access door of a camera including a main body having a film cartridge receiving compartment, a film cartridge access door, a latch switchable between a first latched position, wherein the latch retains the access door in a closed position, and a second unlatched position, wherein the latch is disengaged from the access door, and a lock mechanism structured for movement from a first locked position, wherein the latch is inaccessible, to a second unlocked position, wherein the latch may be accessed, the method comprising the steps of:

engaging the lock mechanism with a key;

moving the lock mechanism from the first locked position to the second unlocked position to expose the latch;

switching the latch from the first latched position to the second unlatched position to open the film cartridge access door.

30. The method of claim 29, wherein said key is further used to switch the latch from the first latched position to the second unlatched position.

31. The method of claim 30, wherein the camera includes a window therethrough, said window aligned with at least a portion of the latch, and wherein at least a portion of the lock mechanism covers said window when in the first locked position and exposes said window when in the second unlocked position.

32. The method of claim 31 wherein a portion of said key is adapted to pass through said window when the lock mechanism is in the second unlocked position and engage the latch in order to switch the latch from the first latched position to the second latched position.

* * * * *